(12) United States Patent
Wabnig et al.

(10) Patent No.: US 12,070,893 B2
(45) Date of Patent: Aug. 27, 2024

(54) METHOD FOR THE CRYSTALLISATION OF A FILM, METHOD AND DEVICE FOR SHAPING A FILM, AND SYSTEM FOR PRODUCING PRODUCTS FROM A THERMOPLASTIC FILM MATERIAL

(71) Applicant: Kiefel GMBH, Freilassing (DE)

(72) Inventors: Erwin Wabnig, Siegsdorf (DE); Gerhard Wieser, Piding (DE); Stefan Schutzinger, Staudach-Egerndach (DE)

(73) Assignee: Kiefel GmbH, Freilassing (DE)

( * ) Notice: Subject to any disclaimer, the term of this patent is extended or adjusted under 35 U.S.C. 154(b) by 703 days.

(21) Appl. No.: 16/627,443

(22) PCT Filed: Jun. 28, 2018

(86) PCT No.: PCT/DE2018/000198
§ 371 (c)(1),
(2) Date: Dec. 30, 2019

(87) PCT Pub. No.: WO2019/001603
PCT Pub. Date: Jan. 3, 2019

(65) Prior Publication Data
US 2020/0156305 A1 May 21, 2020

(30) Foreign Application Priority Data

Jun. 30, 2017 (DE) .................... 10 2017 006 182.3

(51) Int. Cl.
*B29C 51/42* (2006.01)
*B29C 51/44* (2006.01)
(Continued)

(52) U.S. Cl.
CPC .......... *B29C 51/428* (2013.01); *B29C 51/445* (2013.01); *B29C 51/22* (2013.01);
(Continued)

(58) Field of Classification Search
CPC .... B29C 51/428; B29C 51/265; B29C 51/266
See application file for complete search history.

(56) References Cited

U.S. PATENT DOCUMENTS

| 5,618,486 A | 4/1997 | Yoshimi et al. |
| 6,168,740 B1 * | 1/2001 | Koch .................. B29C 49/6463 264/237 |

(Continued)

FOREIGN PATENT DOCUMENTS

| DE | 102016118295 A1 | 3/2018 |
| JP | H0485019 A | 3/1992 |

OTHER PUBLICATIONS

JPH0485019 machine translation (Year: 1992).*

Primary Examiner — S. Behrooz Ghorishi
Assistant Examiner — Alexander A Wang
(74) Attorney, Agent, or Firm — Kowert, Hood, Munyon, Rankin & Goetzel, P.C.; Gareth M. Sampson; Dean M. Sampson (57) ABSTRACT

A method for the crystallization of a film made of a thermoplastic film material, in particular a CPET material, to form a product in which a crystallization process is initiated by shaping the thermoplastic film material within a molding tool. A main crystallization of the crystallization process is carried on outside of the molding tool.

5 Claims, 3 Drawing Sheets

(51) Int. Cl.
*B29C 51/22* (2006.01)
*B29C 51/26* (2006.01)

(52) U.S. Cl.
CPC ...... *B29C 51/261* (2013.01); *B29C 2791/001* (2013.01); *B29C 2793/009* (2013.01); *B29K 2995/004* (2013.01)

(56) References Cited

U.S. PATENT DOCUMENTS

2005/0037168 A1 2/2005 Dalgewicz
2006/0147240 A1* 7/2006 Wolf ..................... B32B 38/12
400/611

* cited by examiner

METHOD FOR THE CRYSTALLISATION OF A FILM, METHOD AND DEVICE FOR SHAPING A FILM, AND SYSTEM FOR PRODUCING PRODUCTS FROM A THERMOPLASTIC FILM MATERIAL

CROSS-REFERENCE TO RELATED APPLICATIONS

This United States application is the National Phase of PCT Application No. PCT/DE2018/000198 filed 28 Jun. 2018, which claims priority to German Application No. 10 2017 006 182.3 filed 30 Jun. 2017, each of which is incorporated herein by reference.

BACKGROUND OF THE INVENTION

The invention relates to a method for the crystallization of a film made of a thermoplastic film material, in particular a CPET material, to form a product, in which a crystallization process is initiated by shaping the thermoplastic film material within a molding tool.

The invention also relates to a method for shaping, in particular for thermoforming, a film made of a thermoplastic film material, in particular a CPET material, to form a product, in which the film is shaped into the product by means of a molding tool before the product is separated from the film.

The invention also relates to a device for shaping, in particular for thermoforming, a film made of a thermoplastic film material, in particular a CPET material, to form a product, having a shaping tool comprising an overall processing surface that is divided into an incoming shaping region and an outgoing shaping region, and having a processing line along which the film is moved through the shaping tool in the machine direction.

The invention also relates to a device for shaping, in particular for thermoforming, a film made of a thermoplastic film material, in particular a CPET material, to form a product, having a shaping tool comprising an overall processing surface that is divided into an incoming shaping region and an outgoing shaping region.

The invention also relates to a system for producing products from a thermoplastic film material, in particular a CPET material, having a shaping station for shaping the thermoplastic film material to form products, in particular having a separating station for separating the products from the thermoplastic film material, and having a processing line along which the thermoplastic film material is moved through the system in the machine direction.

The invention also relates to a shaping, filling and sealing system for producing products from a thermoplastic film material, in particular a CPET material, having a shaping station for shaping the thermoplastic film material to form products, in particular having a separating station for separating the products from the thermoplastic film material, and having a processing line along which the thermoplastic film material is moved through the system in the machine direction.

The invention also relates to a rotary table system for producing products from a thermoplastic film material, in particular a CPET material, having a shaping station for shaping the thermoplastic film material to form products, in particular having a separating station for separating the products from the thermoplastic film material, and having a processing line along which the thermoplastic film material is moved through the system in the machine direction.

In particular, generic methods and devices with which thermoplastic film material is shaped into products are already known from the prior art. In conventional processing of such thermoplastic film materials, such as crystalline polyethylene terephthalate (CPET), in particular foamed CPET, polylactides (PLA) and other biopolymers or the like, both a shaping process of the thermoplastic film material and a crystallization process of this thermoplastic film material take place in a processing tool that is divided into an incoming tool half and an outgoing tool half for this purpose. The thermoplastic material is shaped to form products by means of the incoming tool half, the crystallization process being initiated as a result of this. The thermoplastic material shaped to form the products is subsequently moved on in the direction of the outgoing tool half to subsequently end the previously initiated crystallization process by means of the outgoing tool half, the shaped thermoplastic material being cooled by means of the outgoing tool half for this purpose. After passing through this crystallization process, the products created from the thermoplastic material remain dimensionally stable and cannot be critically deformed or can only be negligibly deformed later by the effect of heat when used properly in permissible temperature ranges.

CPET materials in particular are very dimensionally stable after the end of a crystallization process if they are used properly. In this respect, products produced from CPET materials in particular are suitable for use as, for example, microwave utensils or storage packaging for ready-made products or the like.

A disadvantage of the conventional processing of such thermoplastic materials is in particular that a thermoplastic material must remain in the outgoing tool half for a long time until it is sufficiently crystallized and dimensionally stable enough to work as intended when used later, even when used at high temperatures.

The object of the invention is to further develop generic shaping methods as well as devices and systems used for this purpose in order to also overcome the disadvantages mentioned.

The methods can be carried out in a particularly advantageous manner using the proposed devices or the proposed system.

The object of the invention is achieved in particular by the features of the independent claims. The features of the dependent claims represent advantageous further developments.

In this respect, the present object is, according to a first aspect of the invention, achieved by a method for the crystallization of a film made of a thermoplastic film material, in particular a CPET material, to form a product, in which a crystallization process is initiated by shaping the thermoplastic film material within a molding tool, a main crystallization of the crystallization process being carried out outside of this molding tool.

If the majority of the crystallization takes place outside of the molding tool, preferably on a correspondingly designed crystallization line, the molding tool can be used in a significantly more effective manner for its primary use, namely shaping the film. As a result of this, faster cycle times, for example, can be achieved.

Furthermore, a crystallization process can be influenced in a substantially more targeted manner if said crystallization process takes place largely outside of the molding tool.

A crystallization line newly created in this manner can be realized in a wide variety of ways. For example, the crystallization can be of rectilinear design. Cumulatively or alternatively, the crystallization line can also be designed to be curved, in particular to have a plurality of curves, having at least one curved line portion, or alternatively even circular, having a circular crystallization line extending around an axis of rotation.

The length of the crystallization line can, for example, be selected as a function of a transport speed of the film or as a function of shaped pieces formed therefrom.

Cumulatively or alternatively, the length of the crystallization line can be selected as a function of a crystallization capacity or as a function of a crystallization speed of a film material.

Furthermore, the length of the crystallization line can also be selected as a function of temperatures on the crystallization line.

For the purposes of the invention, the term "shaped piece" describes a film already shaped by means of a molding tool, the thermoplastic material of the film still needing to crystallize before a final product is finally achieved. Such a shaped piece is preferably post-shaped or finally shaped in a further molding tool during or after the crystallization.

A crystallization line designed to be sufficiently long can already be provided if the crystallization line has a length of 1 m. The crystallization line preferably has a length of more than 1 m, preferably more than 2 m. Depending on the area of application, the present crystallization line can also be up to 5 m long.

Various processing devices can be arranged on a crystallization line set up for the purposes of the present invention.

In particular, the crystallization line can comprise processing stations of a shaping, filling and sealing system. In other words, the present crystallization line can be arranged between processing stations of a shaping, filling and sealing system.

Furthermore, the incoming and outgoing shaping regions can advantageously be arranged closely adjacent to one another, as a result of which film material savings, which should not be overlooked, are possible because the blanks formed with the film in particular can be arranged more closely adjacent to one another or can lie against each other.

Another advantage of the present invention is that regional cooling is no longer absolutely necessary within a primary molding tool, in particular a primary shaping tool, as a result of which not only this primary molding tool but in particular also a corresponding shaping station for treating a thermoplastic material can be of a significantly simpler design for the purposes of the present invention.

In other words, there is no need to heat a partial region of the molding tool and cool an immediately neighboring, further partial region of the molding tool, as has hitherto always been absolutely necessary to stabilize the shaped film material in its shaped form by means of a crystallization process before it leaves the molding tool and is provided for further use.

In particular, insulation between an incoming and an outgoing tool half, among other things, can be dispensed with on a molding tool because in the present case the overall processing region (shaping surface) of a molding tool, i.e. both the incoming shaping region and the outgoing shaping region, can be heated and thus used to shape thermoplastic material, i.e. in the sense of a primary tool.

In connection with the present invention, the term "primary molding tool" describes a first molding tool on which a crystallization process can be initiated by shaping a film made of a thermoplastic film material. However, the crystallization process is not continued or even not completed on this primary molding tool. Rather, the shaped piece formed from the film already leaves this primary molding tool after the start of the crystallization process such that at least more than 90% of the crystallization process takes place outside of the primary molding tool.

In this respect, the initiating molding tool or the primary molding tool also embodies the first molding tool in which 80% or 90% of a shaped piece or a product is formed from a preferably flat film.

For the purposes of the invention, the term "main crystallization of a crystallization process" describes a large part of a crystallization that a thermoplastic material, in particular a CPET material, undergoes from a first shaping of the corresponding film to a finished product. For example, the main crystallization amounts to 50% or more of the entire crystallization process.

This first or initiating molding tool or primary molding tool is thus also arranged upstream of the actual crystallization line.

The primary molding tool is preferably part of a primary shaping station that is thus arranged upstream of the crystallization line. In this respect, the further molding tool is assigned to a secondary shaping station that is preferably placed downstream of the crystallization line, if necessary within said crystallization line.

In the present case, the primary molding tool or the primary shaping station and the secondary molding tool or the secondary shaping station can be built or constructed to be substantially identical in design, the main difference in particular being that the primary molding tool or the processing region thereof can at least in part, preferably completely, be heated and that the secondary molding tool or the processing region thereof can at least in part, preferably completely, be cooled.

An advantageous method variant provides that the crystallization process is ended in a further molding tool, a secondary molding tool, the further molding tool differing from an initiating molding tool, a primary molding tool, by means of which the crystallization process was previously initiated. As a result of this, the primary molding tool is ready for another shaping process again substantially faster.

At this point, it should once again be noted more clearly that it was, in the present case, recognized that the phase of the main crystallization of thermoplastic material forms the time-dependent, critical component that slows down the processing of thermoplastic materials.

In this respect, the function of the main crystallization was, for the purposes of the invention, taken from or moved out of the initiating molding tool and advantageously mainly moved into a crystallization line downstream of the molding tool.

Thus, this main crystallization of the thermoplastic material takes place in isolation from the molding tool, in particular in isolation from the first molding tool, as a result of which the component or method component of the previously absolutely necessary molding tool crystallization is omitted or significantly reduced.

As a result, the operating time during which the molding tool is closed is likewise significantly reduced or the operating cycle is significantly increased.

Furthermore, it is advantageous if the main crystallization is carried out along a crystallization line outside of both molding tools while the thermoplastic film material is transported between both of these molding tools.

By means of the crystallization line provided here, it is possible for a crystallization of the shaped thermoplastic film material that progresses over time to take place outside of the actual molding tool.

In this respect, the main crystallization process is decoupled from the operating cycle of the molding tool because said main crystallization process was moved to the crystallization line.

In this respect, the majority of the crystallization takes place during a preferred linear, albeit cycled. movement of the thermoplastic film material in the machine direction and not, as has hitherto been customary, exclusively during a stationary operational cycle of the molding tool, i.e. during a standstill or pause in the movement of the thermoplastic film material in the machine direction.

The present crystallization line is preferably a partial portion of a processing line along which the film is progressively treated in the machine direction.

In this case, the processing line can be designed to be straight. However, the processing line can also be bent or curved about a center point, in particular extend around an axis of rotation.

Accordingly, the crystallization line can also be entirely or at least in part curved. As a result, the space requirement can advantageously be reduced with respect to the overall length of a device or system.

It may be true that a further molding tool (secondary molding tool) or a further shaping station (secondary shaping station) is necessary in the present case, as a result of which the expenditure in terms of machinery increases in this respect. However, with the present invention it is possible to run faster cycle times with respect to the molding tools because it is no longer necessary to wait until the shaped film material has sufficiently crystallized in an outgoing shaping region of a molding tool such that sufficient form stability or contour accuracy of the products produced is ensured.

Furthermore, the entire shaping surface of a molding tool (primary molding tool) is available for actually shaping the thermoplastic film material to form products, as a result of which the number of shaped products per operating cycle of the molding tool can be increased or doubled.

A molding tool normally has an overall processing surface of 800 mm (width transverse to machine direction)×600 mm (length in the machine direction), only approximately 300 mm of usable surface (shaping region) that can be heated being available for the incoming shaping region and likewise only approximately 300 mm of usable surface (crystallization region) that can be cooled being available for the outgoing shaping region, in particular per operating cycle of the molding tool.

In this respect, a maximum blank size of 800 mm×300 mm has hitherto resulted on the film, which was moved cyclically in the machine direction.

However, because the usable surface that can be cooled can now also be used as a usable surface that can be heated, the overall processing surface of 800 mm×600 mm of the molding tool can be used for shaping the thermoplastic film. On the other hand, this results in an increase in size of the usable blanks to 800 mm×600 mm.

For example, it was previously possible to achieve 7 to 8 operating cycles per minute in conventional processing with half the overall processing surface, whereas 15 to 20 operating cycles per minute can be achieved with the present invention with a full processing surface. In the present case, for example, an increased output capacity of up to 20 cycles/min or more can be achieved, in particular with a heat resistance of up to 200° C.

Overall, the present invention results in a good increase in the productivity (increased output of products) of a system for producing products from a thermoplastic film material, in particular a CPET material.

A substantially flat, i.e. level, thermoplastic film is shaped into a three-dimensional product by means of the primary molding tool. The actual crystallization process of the thermoplastic film material is initiated here.

A rather flat form is no longer shaped into a three-dimensional form by means of the secondary molding tool, as was the case with the primary molding tool. Rather, the thermoplastic film material, which crystallized outside of the primary molding tool in the meantime, is once again stabilized in terms of its shaped contour, and the crystallization process is preferably ended by means of targeted cooling such that the shaped thermoplastic film leaves the secondary molding tool in a dimensionally stable state.

The present invention is generally excellent for treating or processing nearly any films made of a thermoplastic material having a partially crystalline structure. In particular, this includes a rigid film.

In particular, this also includes CPET materials, the term "CPET" describing a crystalline polyethylene terephthalate.

In addition to the CPET materials already mentioned, such as, in particular, foamed CPET materials, the present method is also in particular excellent for processing polylactides (PLA) or other biopolymers or the like.

According to a second aspect of the invention, the object of the invention is achieved by a method for shaping, in particular thermoforming, a film made of a thermoplastic film material, in particular a CPET material, to form a product, in which the film is shaped to form the product by means of a molding tool before the product is separated from the film, the shaped film being moved along a crystallization line in the machine direction outside of the molding tool to at least in part crystallize the film material along the crystallization line.

If a part of a crystallization process can be carried out outside of the molding tool or the primary molding tool, the product can be produced from a thermoplastic material in a significantly more effective manner, as a result of which the aforementioned advantages can also be achieved.

In this case, the expression "machine direction" refers to the transport direction in which the film and shaped pieces or products are transported along a production line, the production line being linear and/or A further method variant advantageously provides that the shaped film is transferred to the crystallization line after being shaped by means of the molding tool, along which crystallization line the thermoplastic material of the shaped film further crystallizes before the shaped film is provided for further processing. As a result, it is possible for the thermoplastic material of the shaped film to crystallize outside of the primary molding tool independently of the closing time of the primary molding tool such that further shaping can take place by means of the primary molding tool in the meantime.

Furthermore, it is expedient if the shaped film is transferred to a further molding tool after crystallizing along the crystallization line in order to control the degree of crystallization of the film material by means of the further molding tool. If the shaped film is transferred to a secondary tool after crystallizing on the crystallization line, the crystallization process, which has already been initiated or has already progressed, can additionally be influenced in particular by way of thermal manipulation or it can be completed if this appears to be expedient.

If the shaped film is transferred along the crystallization line to a further molding tool after crystallizing to post-shape the shaped film by means of the further molding tool, the product can be given a particularly precise shape. For example, one can, in this case, think of special functional regions on the product in which it is advantageous for such functional regions to be produced to be of an even higher quality.

Furthermore, it is expedient if the shaped film is transferred to a further molding tool after crystallizing along the crystallization line in order to cool, particularly preferably actively cool, the shaped film by means of the further molding tool. In particular, a crystallization process can be completed by cooling the thermoplastic material in a targeted manner on the further molding tool or the secondary molding tool.

With regard to a further method variant, it is advantageous for the film to be exclusively heated in the molding tool upstream of the crystallization line and/or cooled in a further molding tool downstream of the crystallization line. As a result of this, the individual molding tools can be more simply constructed because heating and cooling devices do not need to be provided together in the individual molding tool.

In other words, this means that the thermoplastic film material is expediently only heated on the primary molding tool, whereas the thermoplastic film material is cooled on the secondary molding tool.

In this case, the term "upstream" describes a position located before or at the beginning of a crystallization line as viewed in the machine direction. Accordingly, the term "downstream" describes a different position located after or at the end of a crystallization line as viewed in the machine direction.

With regard to a more specific embodiment of the present invention, it is advantageous for a crystallization process of a thermoplastic material to be initiated on a first molding tool and for the initiated crystallization process to take place on a further molding tool separate from the first molding tool, a crystallization line being arranged between the first molding tool and the further molding tool, on which crystallization line the thermoplastic material is moved in a linear fashion, in particular moved in the operating cycle of the molding tools during the formation of a crystallization structure.

If a crystallization process of the thermoplastic film material is solely started by means of the molding tool arranged upstream of the crystallization line in the machine direction, the molding tool or the primary molding tool can first and foremost be used to shape a substantially flat film, it not being necessary for the shaped piece formed from the film to remain in this molding tool for a crystallization process.

The method sequence can be further improved if a crystallization process of the thermoplastic material is ended by means of the molding tool arranged downstream of the crystallization line in the machine direction.

In general, it was recognized that the overall method for producing products from a thermoplastic film material, in particular a CPET material, can be sped up if individual processes are decoupled, that is, in particular processes that were previously carried out in a single molding tool. It may be true that at least one additional molding tool is required as a result of this, but the individual molding tools can usually have a simpler design.

In this respect, it is advantageous for processes, such as the shaping of a thermoplastic film material and the crystallization of said thermoplastic film material after shaping, to be separated.

Furthermore, a crystallization process mainly taking place outside of a molding tool, in particular outside of a primary molding tool, offers substantially more possibilities with respect to manipulating crystallization parameters.

It is advantageous if a presettable temperature profile is maintained along the crystallization line. Such a presettable temperature profile allows, for example, different temperature ranges to be configured along the crystallization line, as a result of which the crystallization can additionally be affected by the thermoplastic film material.

Such a temperature profile can be kept constant here such that, for example, a static temperature profile extends along the crystallization line. Alternatively, a temperature profile can be changed, the result being a dynamic temperature profile that can be changed, for example, as a function of crystallization progress.

A particularly preferred method variant provides that the thermoplastic material can crystallize independently of an operating cycle of a molding tool, as a result of which exclusive or additional crystallization time is provided to the thermoplastic material outside of the molding tool to allow it to crystallize. As a result, the molding tool can be used substantially more effectively.

This exclusive or additional crystallization time can by design be provided particularly simply by means of the crystallization line.

Preferably, this exclusive or additional crystallization time is provided to the thermoplastic material or the shaped piece upstream of a further molding tool or the secondary molding tool used here. This means that this exclusive or additional crystallization time is available before a shaped piece or a product is finally shaped.

According to a third aspect of the invention, the object of the invention is achieved by a device for shaping, in particular for thermoforming, a film made of a thermoplastic film material, in particular a CPET material, to form a product, having a shaping tool comprising an overall processing surface that is divided into an incoming shaping region and an outgoing shaping region, and having a processing line along which the film is moved through the shaping tool in the machine direction, the device being characterized in that a crystallization line is arranged between the incoming shaping region and the outgoing shaping region, which crystallization line is at least the size of the incoming shaping machine in the machine direction.

In the present device, a crystallization line is advantageously provided between an incoming shaping region and an outgoing shaping region, on which crystallization line a crystallization process of the thermoplastic material can progress independently of, in particular, the incoming shaping region. As a result, the shaping tool can be used substantially more effectively.

Furthermore, when the device is designed accordingly, a certain intermediate buffer for shaped pieces whose thermoplastic material still needs to crystallize As a result, a decoupling of the necessary crystallization from the cycle rate of the shaping tool can also be achieved.

In this case, the shaping tool is to be equated with the primary molding tool already described at the outset.

In this case, said crystallization line is at least the size of the incoming shaping region. In this respect, the present crystallization line is, for the purposes of the invention, not to be equated with a distance or, in particular, a wall thickness between an incoming shaping region and an outgoing shaping region within a single molding tool, in particular the primary molding tool described above.

According to a fourth aspect of the invention, the object is also achieved by a device for shaping, in particular for thermoforming, a film made of a thermoplastic film material, in particular a CPET material, to form a product, having a shaping tool comprising an overall processing surface that is divided into an incoming shaping region and an outgoing shaping region, a crystallization line being arranged downstream and outside of the shaping tool, along which crystallization line the film material can at least in part be crystallized after being shaped.

Said crystallization line can be constructed outside of said shaping tool in particular without posing any problems in terms of space.

In the present case, a crystallization region of the device has preferably entirely or at least in part been moved out of the shaping tool and into a crystallization line different from the shaping tool.

Furthermore, if a secondary molding tool is arranged farther downstream of the crystallization line, by means of which secondary molding tool the degree of crystallization of the thermoplastic film material can be controlled, products can be produced from a thermoplastic material with even higher quality. Furthermore, a crystallization process can be influenced in a substantially more targeted manner.

The productivity of the shaping tool can also be further improved if the overall processing surface of the shaping tool is heated.

The overall processing surface of the shaping tool is, as a rule, composed of the incoming and the outgoing shaping region, the incoming shaping region often being additionally heated to shape the film and the outgoing shaping region often being actively cooled to end a crystallization process.

If the overall processing surface of the shaping tool is heated, the overall shaping tool, i.e. including the outgoing shaping region, can be used to shape the film, as a result of which a shaping capacity can immediately be doubled in the shaping tool.

Furthermore, a cooling device can be dispensed with, as a result of which the shaping tool is significantly simpler to construct.

In this regard, it is advantageous if both the incoming shaping region of the shaping tool and the outgoing shaping region of said shaping tool can be heated.

An advantageous method variant provides that the shaping tool can be heated upstream of the crystallization line and a further molding tool can be cooled downstream of the crystallization line. As a result, a healed primary molding tool can be provided on the input side and a cooled secondary molding tool can be provided on the output side.

If the crystallization line can be heated at least in certain regions, a crystallization process taking place on the crystallization line can be influenced even better.

If the crystallization line can cumulatively or alternatively be cooled at least in certain regions, a crystallization process can be influenced in an even more targeted manner on the crystallization line.

Another particularly advantageous embodiment provides that the crystallization line comprises an axis of rotation around which a main crystallization can be carried out. As a result, rotational movement is cumulatively or alternatively also possible in addition to a linear, straight crystallization line on which the film is moved in the machine direction in a more translational manner.

This is particularly advantageous if the film is present in a prefabricated state, for example as a blank.

Thus, a more compact design can be achieved than in the case of a purely straight crystallization line.

Furthermore, it is advantageous in this connection if the crystallization line is arranged on a rotary device, in particular on a rotary table. This makes it possible to, in particular, design the crystallization line to be curved or bent. In addition, processing tools or processing stations can be arranged in a compact, circular configuration.

In this respect, it is expedient in the present case for the crystallization line to be at least in part curved and thus to have at least one curved portion.

According to a fifth aspect of the invention, the object of the invention is also achieved by a system for producing products from a thermoplastic film material, in particular a CPET material, having a shaping station for shaping the thermoplastic film material to form products, in particular having a separating station for separating the products from the thermoplastic material, and having a processing line along which the thermoplastic material is moved through the system in the machine direction, the system being characterized by a crystallization line along which the film material can at least in part be crystallized after being shaped, the crystallization line being arranged downstream of the shaping station in the machine direction.

The crystallization of the thermoplastic material can also take place independently of the shaping station and thus also of a shaping tool by means of the present crystallization line.

According to a sixth aspect of the invention, the object of the invention is also achieved by a shaping, filling and sealing system for producing, filling and subsequently sealing products made of a thermoplastic film material, in particular a CPET material, having a shaping station for shaping the thermoplastic film material to form products, in particular having a separating station for separating the products from the thermoplastic film material, and having a processing line along which the thermoplastic film material is moved through the system in the machine direction, the shaping, filling and sealing system being characterized by a crystallization line along which the film material can at least in part be crystallized after being shaped, the crystallization line being arranged downstream of the shaping station in the machine direction.

The crystallization of the thermoplastic material can also take place independently of the shaping station and thus also of a shaping tool by means of the present crystallization line.

According to a seventh aspect of the invention, the object of the invention can equally be achieved by a rotary table system for producing products from a thermoplastic film material, in particular a CPET material, having a shaping station for shaping the thermoplastic film material to form products, in particular having a separating station and/or a discharge station for separating or discharging the products from the thermoplastic film material, and having a processing line along which the thermoplastic film material is moved through the rotary table system in the machine direction, the rotary table system being characterized by a crystallization line along which the film material can at least in part be crystallized after being shaped, the crystallization line being arranged downstream of the shaping station in the machine direction.

In this case, the crystallization of the thermoplastic material can also take place independently of the shaping station and thus also of a shaping tool in such a rotary table system.

In this respect, it is advantageous if the rotary table system is characterized by a rotary table or a rotary device of a different design that is configured to embody a crystallization line.

The present systems can advantageously be further developed if a further shaping station for shaping the thermoplastic film material is arranged downstream of the crystallization line in the machine direction. At the further shaping station, a shaped piece can, for example, be finally shaped, and, in addition to this, a crystallization process can be completed.

For this purpose, the further shaping station preferably has at least one secondary molding tool.

The systems presented here advantageously also comprise a separating station for separating products from the film using a steel strip punch tool or a drop punch tool, the separating station being arranged downstream of the further shaping station such that the products can also immediately be punched out.

It is clear that other separating stations can also be provided in the systems described here, as well as, in general, additional processing stations, such as a stacking station.

At this point, it should once again explicitly be noted that the systems described here can each be characterized by a crystallization line whose features are, in the present case, disclosed in particular in connection with one of the present devices.

At this point, it should also be pointed out that, in the context of the present patent application, indefinite articles and indefinite numerical indications such as "one . . . ," "two . . . ," etc. are generally to be understood as at least indications, i.e. as "at least one . . . ," "at least two . . . ," etc., unless the context or the concrete text of a certain passage shows, for example, that only "precisely one . . . " "precisely two . . . ," etc. are meant.

Furthermore, it should be noted that, in the context of the present patent application, the expression "in particular" is always understood to mean that an optional, preferred feature is being introduced using this expression. The expression is not to be understood to mean "namely."

It is clear that the features of the solutions described above or in the claims can also optionally be combined to allow the advantages and effects achievable in the present case to be implemented in a correspondingly cumulative manner.

Further features, effects and advantages of the present invention will be explained on the basis of the attached drawing and the below description, in which various systems for producing products from a thermoplastic film material using a crystallization line are depicted and described by way of example.

Figure 1:
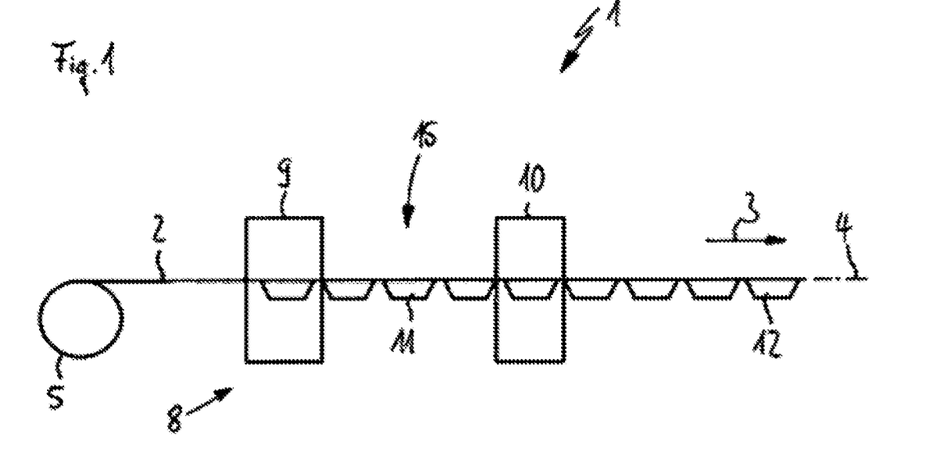
FIG. 1 schematically shows a model view of a device for thermoforming a film having a shaping tool comprising an incoming shaping region and an outgoing shaping region as well as a crystallization line arranged between them.

FIG. 1 shows, in a first embodiment, a device 1 for shaping, in particular for thermoforming, a film 2 made of a thermoplastic film material (not specifically designated), the film 2 being transported through the device 1 along the processing line 4 in the machine direction 3. The film 2 is unwound from a coil 5 here. The processing line 4 is linear and straight in design here. A CPET material is used as a thermoplastic film material here.

In this embodiment, the device 1 comprises a shaping tool 8 having an incoming shaping region 9 as well as an outgoing shaping region 10 arranged farther downstream to shape the film 2 into shaped pieces 11 and finally into finished products 12.

In the present case, the incoming shaping region 9 and the outgoing shaping region 10 form an overall processing surface (not designated again) of the shaping tool 8, at least with regard to the shaping of the shaped pieces 11 or the finished products 12.

Furthermore, the device 1 comprises a crystallization line 15 on which the thermoplastic material of the shaped film 2 can completely crystallize.

In this embodiment, the crystallization line 15 is arranged between the incoming shaping region 9 and the outgoing shaping region 10 and extends in the machine direction 3.

Furthermore, the crystallization line 15 is a partial line (not specifically designated) of the processing line 4 and can be designed to have almost any length within the processing line 4.

The crystallization line 15 is at least the size of the incoming shaping region 9 in the machine direction 3.

In this case, a crystallization process is initiated by the shaping of the film 2 in the incoming shaping region 9 and continued on the crystallization line 15, it being possible to subsequently complete the crystallization process in the outgoing shaping region 10.

The crystallization line 15 makes it possible to move the crystallization out of the incoming shaping region 9 in particular, as a result of which the closing time of the shaping tool 8 can be significantly reduced. As a result, a higher cycle rate can be achieved with the device 1 when shaping the film 2.

Furthermore, the crystallization process can overall be influenced in a greater variety of ways by means of the crystallization line 15, for example by being able to additionally heat and/or cool the crystallization line 15, in particular as a function of the choice of thermoplastic material and/or the film to be processed, for example with regard to the film thickness.

Figure 2:
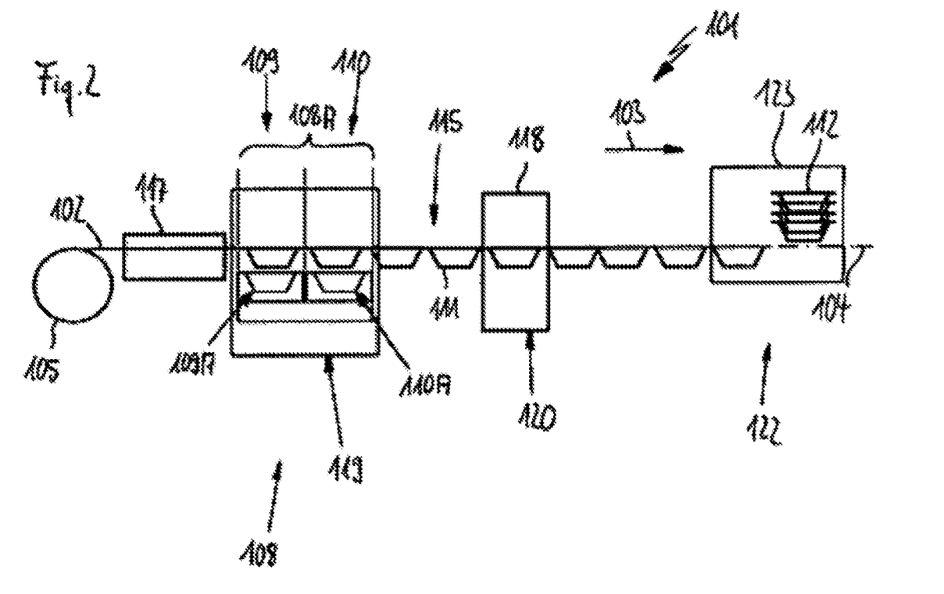
FIG. 2 schematically shows a detailed model view of a further device having a shaping tool, a crystallization line and a further molding tool.

FIG. 2 shows a further embodiment of a device 101 for shaping, in particular for thermoforming, a film 102 made of a thermoplastic film material to form a shaped piece 111 or a finished piece 112 having a shaping tool 108. A CPET material is also used as a thermoplastic film material here.

The shaping tool 108 has an incoming shaping region 109 and an outgoing shaping region 110 that comprise an incoming shaping cavity 109A as well as an outgoing shaping cavity 110A.

In this embodiment, the special feature of the shaping tool 108 can be seen in that both the incoming shaping region 109 and the outgoing shaping region 110 can be heated such that the shaping cavities 109A and 110A available for shaping the film 102 are doubled on the shaping tool 108.

In this respect, the overall processing surface 108A present in the shaping tool 108, by means of which overall processing surface the film 102 can be processed, can also be heated.

The film 102 is transported through the device 101 in the machine direction 103 along a linear and straight processing line 104. The film 102 is again unwound from a coil 105 here.

An additional heating device 117 is placed upstream of the shaping tool 108 to preheat the film 102 before it is shaped with the shaping tool 108.

A crystallization line 115 is integrated into the actual processing line 104 downstream of the shaping tool 108, on which crystallization line the thermoplastic material can crystallize after being shaped. The crystallization line 115 can be designed to have almost any length here.

A further molding tool 118 is arranged further downstream, in which molding tool the film 102 or the shaped piece 11 can subsequently be finally shaped.

In this respect, the shaping tool 108 represents a primary molding tool 119 and the further shaping tool 118 represents a secondary molding tool 120 for the purposes of the present invention.

The degree of crystallization of the thermoplastic film material can be controlled by means of the further molding tool 118 or the secondary molding tool 120, it being possible to actively cool the secondary molding tool 120.

This also means that, in this embodiment, the shaping tool 108 can be heated upstream of the crystallization line 115 and a further molding tool 118 can be cooled downstream of the crystallization line 115.

Furthermore, the crystallization line 115 can be heated and/or cooled at least in certain regions here, as a result of which the crystallization process taking place on the crystallization line 115 can additionally be manipulated.

A punching and stacking device 123 is provided at the end 122 of the processing line 104, at which punching and stacking device the finished products 112 can be punched out and subsequently stacked.

Figure 3:
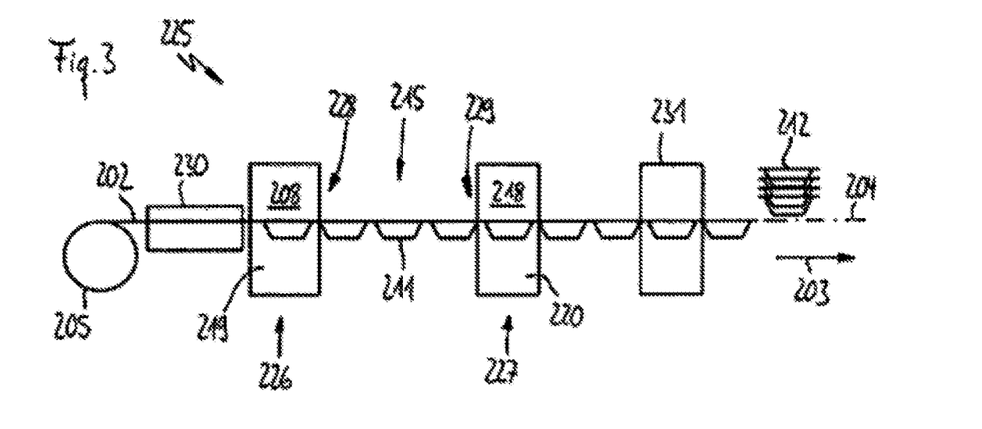
FIG. 3 schematically shows a model view of a system in which a shaped film is moved along a crystallization line in the machine direction outside of a molding tool to at least in part crystallize the film material along the crystallization line, in which system a steel strip punch tool is arranged downstream of a second shaping station.

FIG. 3 shows a different embodiment having a system 225 for producing products 212 from a thermoplastic film material, in particular a CPET material, the products 212 being formed from a film 202 that is unwound from a coil 205 and transported through the system 225 in the machine direction 203 along a processing line 204.

The system 225 is in particular characterized by a first shaping station 226 having a first molding tool 208, a further shaping station 227 having a further molding tool 218 as well as a crystallization line 215 arranged between the first shaping station 226 and the further shaping station 227.

To be more precise, the first shaping station 226 is placed in an input region 228 of the crystallization line 215 and the further shaping station 227 is placed in an output region 229.

Accordingly, the first molding tool 208 of the first shaping station 226 embodies a primary molding tool 219 of the system 225 and the further molding tool 218 of the further shaping station 227 embodies a secondary molding tool 220 of the system 225.

The crystallization line 215 can be designed to have almost any length here. In any case, this crystallization line 215 is also configured to continue a crystallization process initiated at the first shaping station 226 as a main crystallization having all the advantages described here, preferably into the further shaping station 227, where the crystallization process can then be completed.

Furthermore, the system 225 also comprises a heating station 230 by means of which the film 202 can be preheated upstream of the first shaping station 226 before it is shaped into shaped pieces 211 or into the finished products 212.

A steel strip punch station 231 is arranged farther downstream and after the further shaping station 227, by means of which steel strip punch station the products 212 can be punched out of the film 202.

Figure 4:
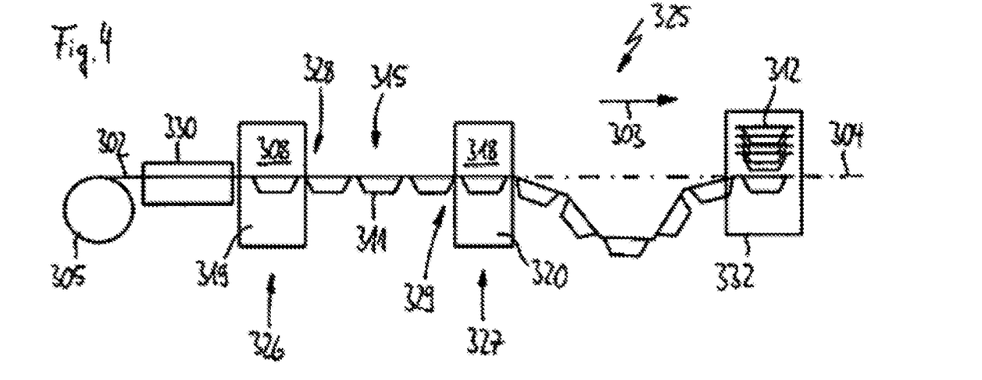
FIG. 4 schematically shows a model view of an alternative system in which a shaped film is moved along a crystallization line in the machine direction outside of a molding tool to at least in part crystallize the film material along the crystallization line, in which system a drop punch tool is arranged downstream of a second shaping station.

FIG. 4 shows a further embodiment having an alternative system 325 for producing products 312 from a thermoplastic material, in particular a CPET material.

In this case, the products 312 are formed from a film 302, the film 302 being unwound from a coil 305 and subsequently being transported through the system 325 in the machine direction 303 along a processing line 304.

The system 325 also has, in particular, a first shaping station 326 having a first molding tool 308 and a further shaping station 327 having a further molding tool 318.

A crystallization line 315 is again arranged between the first shaping station 326 and the further shaping station 327, the first shaping station 326 being placed in an input region 328 of the crystallization line 315 and the further shaping station 327 being placed in an output region 329.

Accordingly, the first molding tool 308 of the first shaping station 326 embodies a primary molding tool 319 of the system 325 and the further molding tool 318 of the further shaping station 327 embodies a secondary molding tool 320 of the system 325.

The crystallization line 315 can be designed to have almost any length here and this crystallization line 315 is configured to continue a crystallization process initiated at the first shaping station 326 as a main crystallization having all the advantages described here, preferably into the further shaping station 327, where the crystallization process can then in turn be completed.

The system 325 also has a heating station 330 by means of which the film 302 can be preheated upstream of the first shaping station 326 before it is shaped into shaped pieces 311 or into the finished products 312.

A punching/stacking station 332 is also arranged after the further shaping station 327, by means of which punching/stacking station the finished products 312 can be punched out of the film 302 and subsequently stacked.

Figure 5:
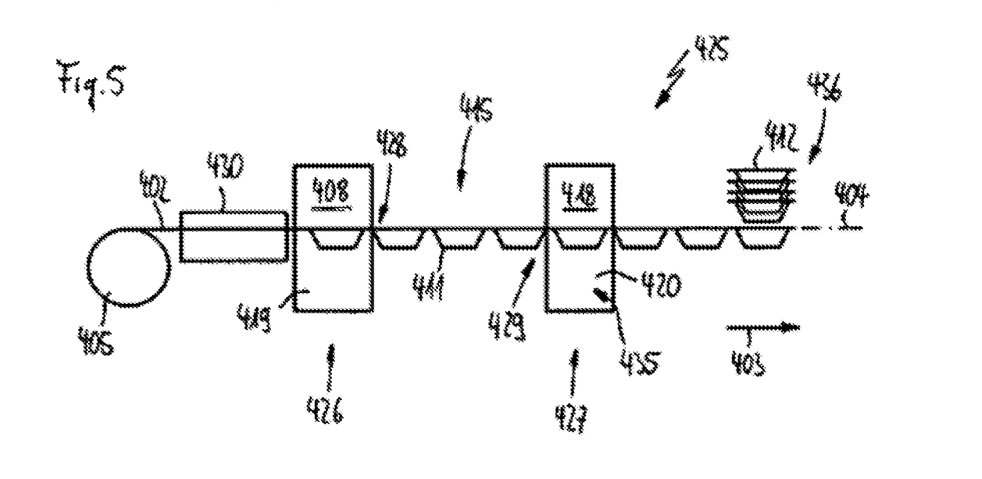
FIG. 5 schematically shows a model view of a further system in which a shaped film is moved along a crystallization line in the machine direction outside of a molding tool to at least in part crystallize the film material along the crystallization line, in which system a punching device is integrated into the second shaping station.

The embodiment illustrated in FIG. 5 also shows a system 425 by means of which products 412 can be produced from a thermoplastic film material, in particular a CPET material.

The products 412 are formed from a film 402 here. For this purpose, the film 402 is unwound from a coil 405 and the film 402 is subsequently transported through the system 425 in the machine direction 403 along a processing line 404.

This system 425 also uses, in particular, a first shaping station 426 having a first molding tool 408 and a further shaping station 427 having a further molding tool 418 between which a crystallization line 415 is placed.

In this case, the further shaping station 426 is not only equipped with the further molding tool 418 but is simultaneously provided with a punch (not explicitly shown and designated). In this respect, the further shaping station 426 is a steel strip shaping and punching station 435 that is located at the end of the crystallization line 415.

While the first shaping station 426 is in an input region 428 of the crystallization line 415, the further shaping station 427 or the steel strip shaping and punching station 435 is, in this respect, placed in an output region 429 of the crystallization 415.

Accordingly, the first molding tool 408 of the first shaping station 426 embodies a primary molding tool 419 of the system 425 and the further molding tool 418 of the further shaping station 427 embodies a secondary molding tool 420 of the system 425.

The crystallization line 415 can also be designed to have almost any length in this embodiment.

In this case, this crystallization line 415 is also once again configured to continue a crystallization process initiated at the first shaping station 426 as a main crystallization having all the advantages described here, preferably into the further shaping station 427, where the crystallization process can then in turn be completed.

A heating station 430 is arranged on the system 425 before the shaping station 426, by means of which heating station the film 402 can be preheated upstream of the first shaping station 426 before they are shaped into shaped pieces 411 or into the finished products 412.

Following the further shaping station 427 or the steel strip shaping and punching station 435, the finished products 412 are stacked to form a stack of products 436.

Figure 6:
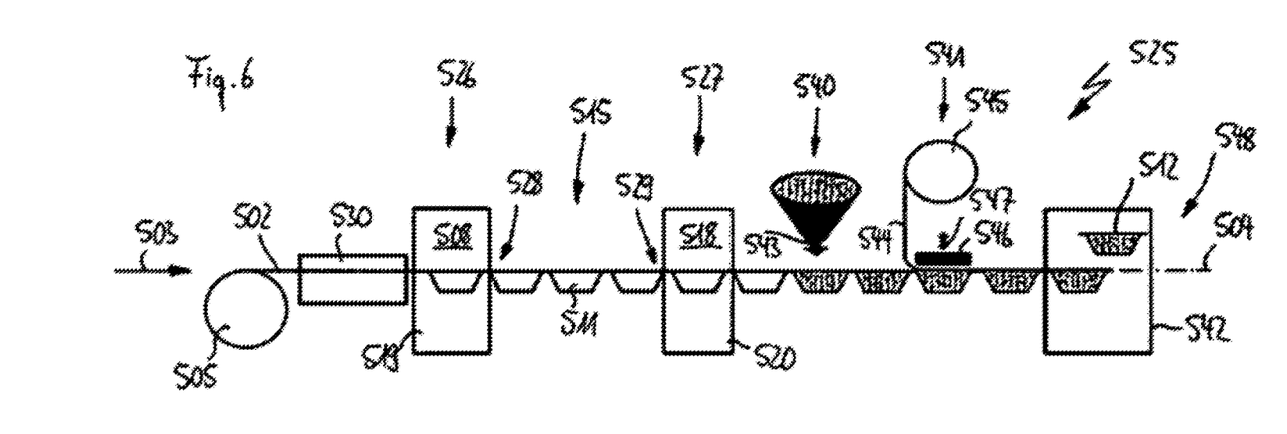
FIG. 6 schematically shows a model view of a system in the form of a shaping, filling and sealing system in which a shaped film is again moved along a crystallization line in the machine direction outside of a molding tool to at least in part crystallize the film material along the crystallization line.

FIG. 6 shows an additional embodiment of a shaping, filling and sealing system 525 by means of which products 512 can be produced from a thermoplastic film material, in particular a CPET material. In this case, the products 512 are also formed from a film 502 that is unwound from a coil 505. The film 502 is then transported through the shaping, filling and scaling system 525 in the machine direction 503 along a processing line 504, the processing line 504 being of rectilinear design. In this respect, the film 502 is also transported through the shaping, filling and sealing system 525 in a translational manner in the machine direction 503 in this embodiment.

The processing line 504 comprises a crystallization line 515 on a partial portion (not designated again), which crystallization line is of rectilinear design, exactly as in the case of the systems 225, 335 and 425 already explained above.

A first shaping station 526 is arranged in an input region 528 of the crystallization line 512 and a further shaping station 527 is arranged on the crystallization line 515 in an output region 529 of the crystallization line 515.

The first shaping station 526 comprises a first molding tool 508 that, in this respect, embodies a primary molding tool 519 of the system 525.

Accordingly, the further shaping station 527 comprises a further molding tool 518 that represents a secondary molding tool 520 of the system 525.

In this further embodiment having the shaping, filling and scaling system 525, the crystallization line 515 can also be designed to have almost any length to continue a crystallization process initiated at the first shaping station 526 as a main crystallization on the crystallization line 515, it being possible for this main crystallization to take place into the further shaping station 525, at which the crystallization process can then finally be completed.

In a manner similar to the systems 225, 325 and 425 described above, the shaping, filling and sealing system 525 also has a heating station 530 by means of which the film 502 can be preheated upstream of the first shaping station 526 before the film 502 is then shaped into shaped pieces 512 or into the finished products 512 with the aid of the primary molding tool 519.

A filling station 540, a sealing station 541 and a separating station 542 are located farther downstream on the processing line 504 in the machine direction 503 after the second shaping station 527 having the secondary molding tool 520 such that the products 512 hitherto produced with the shaping, filling and sealing system 525 can subsequently be filled with almost any filling material 543 at the same time.

Even farther downstream, the sealing station 541 is located after the filling station 540, by means of which sealing station the products 512 filled with the respective filling material 543 can then be sealed with a sealing film 544.

In this embodiment, the sealing film 544 is wound onto a supply roll 545 and is applied to the respective product 512 after being unwound from said supply roll 545 and placed onto the filled products 512 by means of a sealing unit 546, namely with a sealing movement 547 transverse to the machine direction 503.

The products 512 thermoformed, filled and sealed in this manner are then separated at the end of the processing line 548 by means of the separating station 542 such that ready-to-use packaging units (not designated here) are ultimately present at the end of the processing line 504.

In this respect, the embodiment illustrated in FIG. 6 shows by way of example how a unit composed of a filling station 540, a sealing station 541 and a separating station 542 can be combined with the present crystallization line 515, it being unnecessary to discuss the individual design of the filling station 540, the sealing station 541 and the separating station 542 in further detail in the present case because they are widely known in terms of designs and methods.

FIG. 7 shows, once again by way of example, a different embodiment in the form of a rotary table system 625 for producing products 612 from a thermoplastic film material in the form of a film 602, the thermoplastic film material being a CPET material. In this case, the film 602 is again unwound from a coil 605 and subsequently prefabricated to form individual blanks 651 by means of a blanking unit 650.

Figure 7:
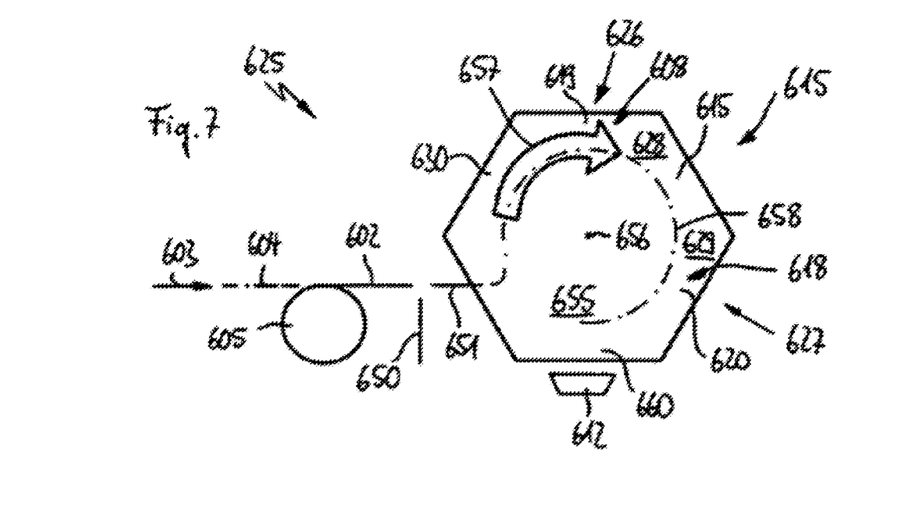
FIG. 7 schematically shows a model view of a different system having a rotary table in which a shaped film is moved along a crystallization line in the machine direction outside of a molding tool to at least in part crystallize the film material along the crystallization line.

These prefabricated blanks 651 are then transferred to a rotary table 655 in the machine direction 603, which rotary table rotates about an axis of rotation 656. The machine direction 603 is thus not only of rectilinear design, as is the case with the systems 225, 325, 425 and 525 described above, but it also has a circular component (not shown and designated again here) such that a processing line 604 accordingly also has a curved partial portion 658.

When the rotary table 655 is rotated in the direction of rotation 657, the separated blanks 651 successively reach the individual processing stations of the rotary table system 625, such as a heating station 630, a first shaping station 626 having a first molding tool 608 or having a primary molding tool 619, a second shaping station 627 having a further molding tool 618 or a secondary molding tool 620, and a discharge station 660.

At this point, it should also be noted that the second shaping station 627 can optionally also be designed as a steel strip shaping and punching station (not explicitly designated here), as is explained, for example, with regard to the embodiment of FIG. 5. In such an optional embodiment, the products 612 can then optionally simultaneously be stacked at the discharge station 660.

In any case, a crystallization line 615 is again located between the first shaping station 626 and the second shaping station 627 such that the first shaping station 626 is located in an input region 628 of the crystallization line 615 and the second shaping station 627 is arranged in an output region 629 of the crystallization line 615 accordingly.

The crystallization line 615 is designed to be curved or bent on the rotary table 655. In any case, the crystallization line 615 is part of the aforementioned curved partial portion 658 of the processing line 604.

With regard to the rotary table system 625 for producing products 612, it should furthermore be noted that the film 602 or the separated blanks 651 are transported to the individual processing stations 630, 626, 627 and 660 and also to the crystallization line 615 by means of the rotary table 655.

In this case, the number of processing stations can vary depending on the product requirements and on crystallization line 615.

It is clear that the film 602 or the separated blanks 651 can also be preheated outside of the rotary table 655.

In any case, the rotary table system 625 illustrates a system of a shorter and very compact design for producing products from a thermoplastic film material for the purposes of the present invention.

At this point, it should explicitly be pointed out that the features of the solutions described above or in the claims and/or figures can optionally also be combined to implement or achieve the described features, effects and advantages in a correspondingly cumulative manner.

It is clear that the embodiments described above are merely initial designs of the invention. In this respect, the design of the invention is not limited to these embodiments.

All of the features disclosed in the application documents are claimed as being essential to the invention to the extent to which they are novel over the prior art either individually or in combination.

LIST OF REFERENCE SIGNS

- 1 device
- 2 film or film material
- 3 machine direction
- 4 processing line
- 5 coil
- 8 shaping tool
- 9 incoming shaping region
- 10 outgoing shaping region
- 11 shaped pieces
- 12 products
- 15 crystallization line
- 101 device
- 102 film or film material
- 103 machine direction
- 104 processing line
- 105 coil
- 108 shaping tool
- 108A overall processing surface
- 109 incoming shaping region
- 109A incoming shaping cavity
- 110 outgoing shaping region
- 110A outgoing shaping cavity
- 111 shaped pieces
- 112 products
- 115 crystallization line
- 117 heating device
- 118 further molding tool
- 119 primary molding tool
- 120 secondary molding tool
- 122 end of the processing line
- 123 punching and stacking device
- 202 film or film material
- 203 machine direction
- 204 processing line
- 205 coil
- 208 first molding tool
- 211 shaped pieces
- 212 products
- 215 crystallization line
- 218 further molding tool
- 219 primary molding tool
- 220 secondary molding tool
- 225 system
- 226 first shaping station
- 227 second shaping station
- 228 input region
- 229 output region
- 230 heating station
- 231 steel strip punching station
- 302 film or film material
- 303 machine direction
- 304 processing line
- 305 coil
- 308 first molding tool
- 311 shaped pieces
- 312 products
- 315 crystallization line
- 318 further molding tool
- 319 primary molding tool
- 320 secondary molding tool
- 325 system
- 326 first shaping station
- 327 second shaping station
- 328 input region
- 229 output region
- 330 heating station
- 332 punching and stacking station
- 402 film or film material
- 403 machine direction
- 404 processing line
- 405 coil
- 408 first molding tool
- 411 shaped pieces
- 412 products
- 415 crystallization line
- 418 further molding tool
- 419 primary molding tool
- 420 secondary molding tool
- 425 system
- 426 first shaping station
- 427 second shaping station
- 428 input region
- 429 output region
- 430 heating station
- 435 steel strip shaping and punching station
- 436 stack of products
- 502 film or film material
- 503 machine direction
- 504 processing line
- 505 coil
- 508 first molding tool
- 511 shaped pieces
- 512 products
- 515 crystallization line 518 further molding tool
519 primary molding tool
520 secondary molding tool
525 shaping, filling and scaling system
526 first shaping station
527 second shaping station
528 input region
529 output region
530 heating station
540 filling station
541 sealing station
542 separating station
543 filling material
544 scaling film
545 supply roll
546 sealing unit
547 sealing movement
548 end of the processing line
602 film or film material
603 machine direction
604 processing line
605 coil
608 first molding tool
612 products
615 crystallization line
618 further molding tool
619 primary molding tool
620 secondary molding tool
625 rotary table system
626 first shaping station
627 second shaping station
628 input region
629 output region
630 heating station
650 blanking unit
651 blanks
655 rotary table
656 axis of rotation
657 direction of rotation
658 curved partial portion
660 discharge station

The invention claimed is:

1. A method for crystallization of a thermoplastic film material to form a product, said method comprising:
   initiating a crystallization process by shaping the thermoplastic film material into a first shape within a first primary shaping station having a forming tool as a first molding tool;
   moving the first shape thermoplastic film material out of the first primary shaping station and out of the first molding tool and onto a crystallization section located between the first shaping station and a secondary shaping station where a majority of the crystallization process occurs outside of the first molding tool during a clocked movement in a machine direction, wherein the machine direction refers to a transport direction in which film, blanks or products are conveyed along a production line;
   moving the first shape thermoplastic film material into the secondary shaping station having a further molding tool as secondary molding tool, the secondary molding tool being different than the first molding tool and if needed, further shaping and/or crystallization processing the first shape thermoplastic film material; and
   carrying out the majority of the crystallization process along the crystallization section outside the first and second molding tools while the thermoplastic film material is transported between the first and second molding tools without any molding or shaping of the thermoplastic film material occurring during the transport.

2. The method according to claim 1, wherein the crystallization process of the thermoplastic film material is exclusively started by means of the first molding tool located upstream of the crystallization section in the machine direction and/or is ended by means of the further molding tool arranged downstream of the crystallization section in the machine direction.

3. The method according to claim 1, further comprising independently crystallizing the thermoplastic material of a working cycle of one of the first or further molding tools and giving exclusive or additional crystallization time to the thermoplastic material outside the first or further molding tool to crystallize.

4. The method according to claim 1, further including, transferring the thermoplastic film material shaped at an incoming molding region to the further molding tool after the crystallization along the crystallization section to control a degree of crystallization of the thermoplastic film material by means of the further molding tool and/or to post-mold the shaped thermoplastic film material by means of the further molding tool.

5. The method according to claim 1, further including, exclusively heating the thermoplastic film material in the first molding tool upstream of the crystallization section and/or cooling in the further molding tool downstream of the crystallization section.

* * * * *